Figure 1:
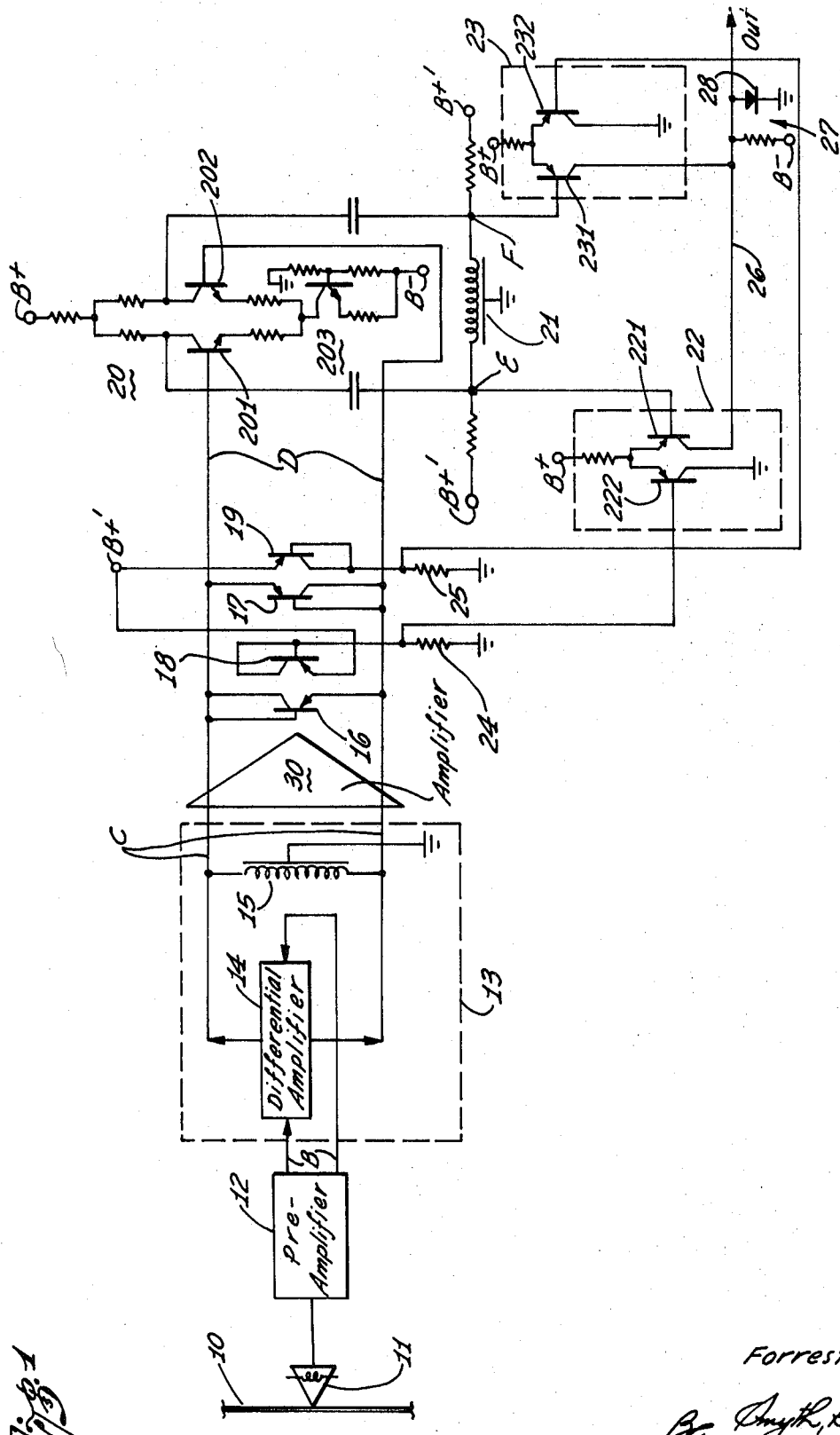

United States Patent

[11] 3,569,843

[72] Inventor Forrest C. Meyer
 San Diego, Calif.
[21] Appl. No. 809,586
[22] Filed Mar. 24, 1969
[45] Patented Mar. 9, 1971
[73] Assignee Systems Peripherals Division
 San Diego, Calif.

[54] ZERO CROSSING DETECTORS
 12 Claims, 3 Drawing Figs.
[52] U.S. Cl. .................................................. 328/150,
 307/229, 307/235, 307/260, 328/127
[51] Int. Cl. ...................................................... H03k 17/00,
 H03k 5/153
[50] Field of Search .......................................... 328/127,
 147, 132, 150; 330/30 (D), 69; 307/229, 231, 260,
 235

[56] References Cited
 UNITED STATES PATENTS
 2,448,718 9/1948 Koulicovitch ............... 328/150
 3,207,915 9/1965 Brunschweiger ............ 328/150X Primary Examiner—Donald D. Forrer
Assistant Examiner—B. P. Davis
Attorney—Smyth, Roston and Pavitt ABSTRACT: A readout signal processing circuit is disclosed wherein the read signal is provided by a transducer scanning a magnetic recording surface. The signal is delay-line-differentiated, doubly clipped and again delay-line-differentiated. A double-ended output of the second differentiator is separately connected to two differential-type amplifiers respectively receiving a reference derived from diodes duplicating the clipping levels. The outputs of the two amplifiers are coupled to provide a single output train, the pulses of which are alternatingly produced in the two amplifiers in representation of oppositely directed zero crossings in the differentiated transducer readout signals representing in turn magnetic flux reversals on the recording surface.

INVENTOR
Forrest C. Meyer
ATTORNEYS

ZERO CROSSING DETECTORS

The present invention relates to a circuit for processing signals which have resulted from reproduction of recorded information. Digital data are recorded, for example, on a magnetic storage carrier along a track on the surface thereof and, in that, for example, the spacing of sequential changes in the direction of magnetization is of digital significance. By definition then, these changes do not occur regularly but, from a point of view of recording alone, and disregarding any interpretation, these changes occur at spacings which vary at random. The range of such variations in the spacing depends on the recording format and encoding pattern used to store the digital data The various formats are not discussed here as the invention is of significance for all of them; however, the invention can be practiced with particular advantage in a system improved therewith where the density of such magnetic flux or magnetization direction reversals is very high, so that the resulting readout signals have relatively high frequency.

The "irregular" spacing of the flux reversals or transitions results in variable frequencies in the electric transducer output signals as provided by the read or reproduce transducer. This means that sequential half-waves of different polarities are often differently long. Accordingly, the baseline or reference line of such output signals is difficult to detect and sequential segments thereof may vary relative to each other in amplitude-duration. The immediate transducer output signals are processed at first as analogue signals, but for decoding them so as to reestablish the digital data, it is necessary to meter the spacing of the characteristics in the readout signal which defines the transitions on the record carrier. This requires, from a general point of view, establishing signals (pulses) with sharp rise times to permit accurate metering of the delay between sequential pulses. Generation of such pulses in turn requires transformation of the analogue-type readout signal (or of an analogue processed signal derived therefrom) by using an inherently gradually sloping portion thereof for generating a steep slope for formation of a pulse flank. The direction of traversal of a reference level by the sloping, analogue-type readout signal (zero crossing or crossover detection) reconstitutes the passage of a transition on the record carrier at the transducer.

Such pulse formation requires usually high-gain amplification and early saturation or limiting. As transitions to be detected occur in either direction, such slopes can have positive or negative gradient, so that high-gain amplification and saturation or diode limiting is required in both directions of signal polarity which means that usually an amplifier is caused to saturate or limit in one direction by first desaturating it from saturation in he opposite direction. If the transitions were to occur regularly or vary only within a narrow frequency band around the data rate as fundamental, such operation would not pose problems as to recovery. However, the readout signal frequency can vary over a range which for some recording point may well exceed a 2:1 frequency ratio. Moreover, it is this variation in frequency which contains the information. Accordingly, sequential, irregularly spaced desaturations of the amplifier and resaturations in the opposite character for the purpose of zero crossing or crossover detection has the tendency to square the signal so that a time and phase displacing error is introduced which deteriorates accuracy as to the time of the crossover detection. Bit crowding (readout signal peak displacement) is already a material source for readout signal distortion in case of high data package densities, causing time and phase displacement of the crossover and zero crossing detection even prior to any processing, so that such additional time and phase displacement errors in the processing becomes less and less tolerable.

It is an object of the invention to detect zero crossings for the purpose of reconstructing the phase and time of occurrence of a transition on a storage carrier in a manner which does not require bidirectional zero crossing detection in the same signal path.

It is another object of the present invention to keep the readout signal at floating potential until processed in a manner in which the common mode error in the analogue readout signal resulting from the zero or baseline shift is compensated in that a portion of the preliminarily processed analogue readout signal can be used as a preliminary, temporary said intermittent reference which remains constant with reference to any fixed external potential such as ground or a fixed biasing source.

It is another object of this invention to provide crossover detection without requiring desaturation of an amplifier at the critical instant of detection. It is a further object of the invention to provide a system for crossover or zero crossing detection in a manner so that for each detection step a particular reference level is reestablished which renders the detection independent from any previous crossover detection, for example, of opposite polarity.

In accordance with the present invention, the readout signal, as derived from a transducer reading digital recordings of the type described is essentially analogue-processed using bidirectional clipping to establish a signal which swings between two levels, whereby the crossover to be detected occurs during such change from one level to another. The signal lines holding the clipped signal are kept at floating potentials and crossover detection is deferred until common mode signal variations relative to any fixed potential are compensated out of the system.

A separate reference level is provided for each crossover detection, in each of the two possible directions, using two separate signal channels. The clipped signal is separately compared with each reference level and in the two channels to establish a pulse with sharp rise time during each such comparison. Particularly the dual comparison operates in the two channels such that in each channel a crossover in but one direction is detected by providing a sharp rise time pulse high-gain amplification. The two channels are controlled by the reference signals such that at least prior to each detection step the channels is not saturated so that the processed, clipped signal when tranversing the level does not have to control desaturation. Each channel experiences subsequently a crossover in the opposite direction which is not used further, so that the amplifier in each channel if saturated simply pulls out of saturation but does not have to resaturate in an opposite direction.

In the preferred form of practicing this invention, it is suggested to employ a first delay line type differentiating circuit for analogue processing the transducer readout signal. A double-ended output of that differentiating circuit is crosscoupled by two diodes in antiparallel relationship for providing clipping. A bidirectional, clipped signal is passed to a second delay line differentiating circuit having its two outputs coupled separately to two high gain differential amplifiers and comparing individually the inputs they receive with reference voltages derived from a second pair of diodes individually matched to the clipped diodes. The two differential amplifiers have coupled outputs with a common clipping stage which prevents amplifier saturation if their respective signal input is above the reference level. A pulse is provided for each traversal of the reference level in one direction as to each amplifier. The leading edge of such pulse represents a detected zero crossing.

Figure 2:
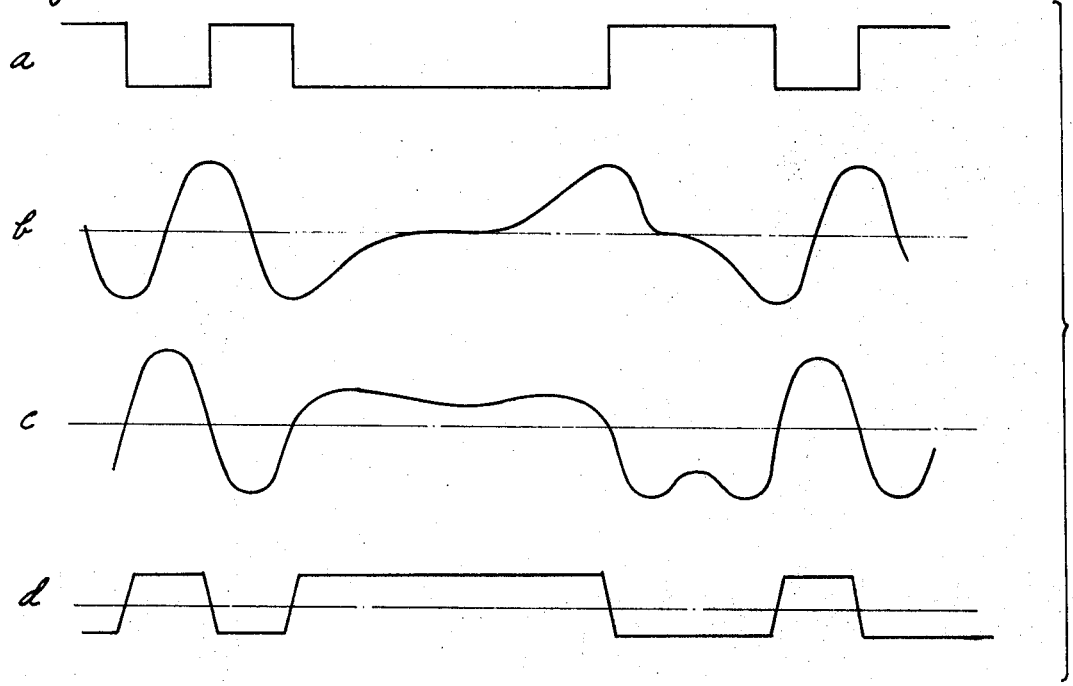
Figure 3:
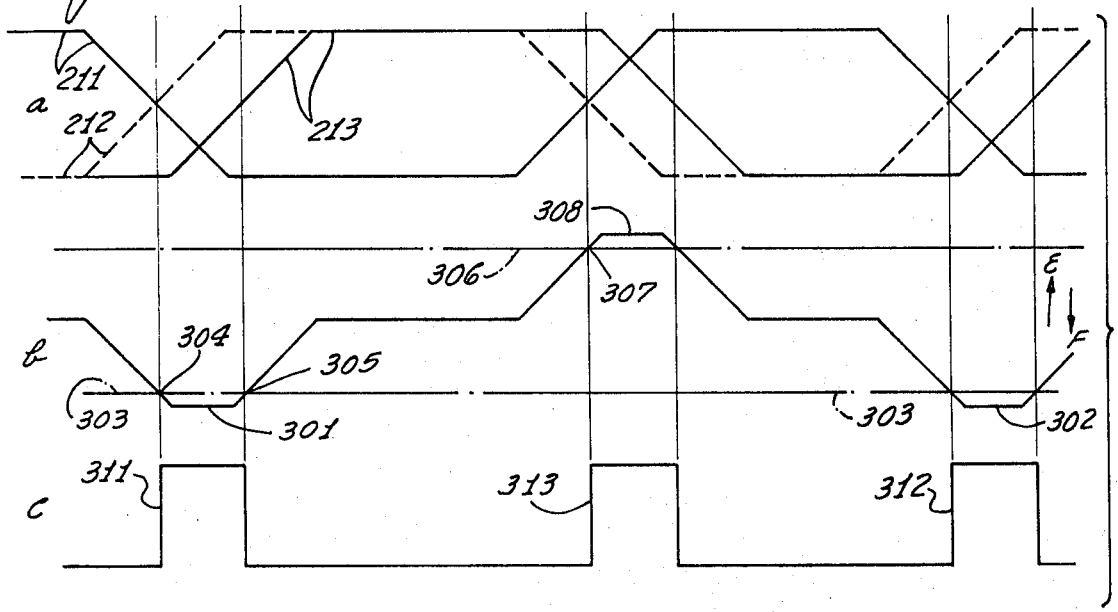

While the specification concludes with claims particularly pointing out and distinctly claiming the subject matter which is regarded as the invention it is believed that the invention, the objects and features of the invention and further objects, features and advantages thereof will be better understood from the following description taken in connection with the accompanying drawings in which:

FIG. 1 illustrates a circuit diagram of the preferred embodiment of the invention and FIG. 2 and 3 show timing diagrams of significant signals in the system shown in FIG. 1.

Proceeding now to the detailed description of the drawings, in FIG. 1 thereof there is illustrated an example of the preferred embodiment for practicing the present invention.

Reference numeral 10 denotes a magnetic recording surface generally, however, preferably it is of the type which permits storage of data at high data package densities, such as a magnetic disc or drum. Nevertheless, surface 10 could also pertain to a magnetic tape. It shall be assumed that digital data are recorded in a track on the carrier 10 in a format in which the spacing in between sequential reversals of the direction of the magnetic flux is of bit frame and/or bit value defining significance.

A typical recording therefore is illustrated in FIG. 2a wherein the signal amplitude denotes magnetization along an arbitrarily chosen direction extending along the track, a particular track length portion serving as abscissa. However, FIG. 2a can also be interpreted as representing flux direction on the track as it passes a stationary point during motion of the carrier 10, in which case the abscissa would represent time. It is this latter interpretation which provides basis for time-signal comparison for the several traces and curves in the remaining lines of FIG. 2, plotted in vertical alignment representative of a common time scale.

It follows from he foregoing that the spacing of these flux reversals from each other have to be metered in order to restore the digital data as recorded on the track. Therefore, the detection of occurrence of such transitions and their spacing is the principal object of a data-reproduce process.

The data as recorded in carrier 10 along the track, as stated, are reproduced by a transducer 11 of conventional type and feeding a preamplifier 12. As the transducer gap passes along the track, a voltage is induced across the coil or coil system of the transducer, which voltage appears at the double-ended output B of preamplifier 12. Whenever a transition passes the transducer gap, the amplitude of the output voltage is at a maximum at a particular polarity which depends upon the direction of the change in direction of the magnetic flux within that transition zone passing the transducer.

For the particular recording, as shown in FIG. 2a, the output voltage across terminals B of amplifier 12 may have a configuration as shown in FIG. 2b. In view of the fact that the spacing of the transitions carries the information, these transitions and, therefore, the output voltage peaks do not occur generally at a precisely constant repetition rate. Thus, the output voltage of the transducer and as appearing across terminals B is not sinusoidal but has asymmetrical configuration, particularly because the variable spacing of transitions on the track result in variations in frequency of the transducer output signal. This means that the output voltage does not have a clearly defined and, therefore, readily reproducible base line.

Detection of occurrence of the transitions and their time-space relationship is the principal object of a circuit for processing reproduced recordings of this type. Amplitude strobing of the readout signal has proven troublesome. Thus, occurrence, i.e., time and phase, of the transitions are usually detected by differentiating the transducer output signal to correlate zero crossing of the differentiated signal with the transitions and regard them as reproductions of the transitions.

This type of signal processing is chosen in the present embodiment. However, the zero line shift of the transducer output poses the problem that the zero crossings of a differentiated output after amplification may appear shifted in time in relation to he passage of the transitions at the transducer which the zero crossings are supposed to represent as reproduction thereof.

The differentiating circuit employed in the system which incorporates the invention, therefore includes a differentiating circuit 13 which for reasons of power requirements is not an LC or an RC circuit of conventional type, but instead, a so-called delay line differentiating circuit is used. The output voltage of the preamplifier 12 is, therefore, fed to a differential amplifier 14 included in this differentiating circuit 13, i.e., the two input terminals of a differential amplifier 14 connect to the terminals B. Differential amplifier 14 has output terminals C and tends to develop a voltage which is a replica of the voltage as applied to the input at B (FIG. 2b).

The voltage at terminals C can also be considered as being two voltages which are out of phase by 180° with reference to each other. A delay line 15 mutually cross-couples the two output terminals C so that the voltage actually tending to appear at any instant at these terminals is the difference between the output voltage at one output terminal of the differential amplifier with reference to the other one plus the invented and delayed output as derivable from the respective other output of the differential with reference to the first output terminal thereof. As this process is duplicated for each output and at each end of the delay line, a voltage representing differentiation of the curve shown in FIG. 2b appears across terminal C, and as plotted in FIG. 2c.

A differential amplifier 30 has its two inputs connected to the two terminals C and has a pair of output terminals D. A pair of clipping diodes in the form of base-to-collector short-circuited transistors 16 and 17 are connected across terminals D. As the diodes are connected in parallel and in phase opposition, the voltage difference between the output lines D of the differential amplifier 30 cannot exceed the forward threshold values of the base-emitter diodes of transistors 16 and 17 in either direction. It follows, therefore, that for the output signal provided by differentiating circuit 13 and assumed to be of the type shown in FIG. 2c, a signal develops across output terminals D of amplifier 30 as plotted in FIG. 2d.

The signal peaks between the two terminals D are thus limited to a maximum excursion, which for either direction of potential difference is equal to the forward threshold voltage of the base-emitter diode of one or the other of transistors 16 and 17. It should be mentioned that transistors 16 and 17 could, to some extend, differ as to the forward threshold voltage which would not impair proper functioning of the system in accordance with the invention for reasons below. However, a closely matched pair of transistors is preferred.

It is an important feature that clipping action of the diodes is utilized primarily to establish particular signal levers between the terminals D, and the voltage across these terminals swings into and out of the level without delay as any amplifier is not controlled into and out of saturation by this clipping action. There is not even a storage time problem involved in the transistor operation due to permanent base-collector short circuit. Therefore, as the voltage between terminals D swings from one level to another, the resulting signal flanks are faithful replicas of the instantaneous signal amplitude of the differentiator output (FIG. 2c) between peaks. However, the potential of the two terminals D relative to ground or to any other fixed level, may well have a common mode error due to the baseline displacement in the readout signal as propagating through the differentiator 13.

The terminals D are connected to the two input terminals of a differential amplifier 20 having a delay line 21 coupled across its two output terminals E and F. Amplifier 20 includes two transistors 201 and 202 with a common emitter circuit kept at floating potential by operation of a current source 203. The amplifier thus operates in common mode rejection-type configuration. Amplifier 20 is a buffer amplifier and because the single-ended output has to be equal to the difference input, a gain of 2 is needed. The reason being that the single-ended output will be compared to a reference level equal to he difference input of amplifier 20.

The two output terminals of differential amplifier 20 thus constitute summing points. Individually, the output voltages amplifier 20 tends to develop across its output terminals are in phase opposition when using one or the other terminal as respective reference. In open-end configuration summing point E, therefore receives one output signal as derivable from one output of differential amplifier 20 as referenced against the other output, plus a delayed signal as derivable concurrently from the other output of differential amplifier 20 as referenced against the first output. The other summing point illustrated F, receives a mirror image of the signal developed in point E and summed thereat.

The signals plotted in the left-hand portion of FIG. 2a through FIG. 2d and as processed in this particular circuit which includes amplifier 20 and delay line 21, are plotted in an expanded time scale in FIG. 3a. Trace 211 shows the output differential amplifier 20 tends to feed directly to point E. The dashed line 212 illustrates a signal which the other output of amplifier 20 tends to feed to point F. Signals 211 and 212 respectively at terminals E and F are, of course, in phase opposition, as each of them is referenced to the respective other one of terminals F and E.

Each of these signals is also an input for delay line 21 and at opposite ends thereof. Particularly curve 212 denotes also the input for the delay line 21 at terminal F. The resulting delayed signal is the solid trace 213 received at point E. The solid line in FIG. 3b illustrates the resulting sum of signals derivable from point E and taken with reference to point F. The zero level of this curve is a true zero line resulting from equality of potential at points E and F and which is established solely by complementary addition of the voltage established at times across the diodes 16 and 17 after similar amplification in amplifier 20 and inverse summation in the output circuit of the amplifier.

Each segment of the curve (FIG. 3b) along the zero level does not depend on similarity of the threshold levels of diodes 16 and 17, but each such segment is established from the threshold level signal of the same diode. As long as such a level prevails as signal across terminals D, zero voltage can be established between terminals E and F, because he directly resulting amplified signal and the respective delayed invented output of amplifier 20 are negatively summed at each point E and F. The zero segments in the resulting output signals each have duration equal to the period for which clipping level prevails across terminals D minus the delay period of delay line 21.

In view of the complete symmetry of the circuit, the invented voltage as shown in FIG. 3b can be derived from terminals F with E serving as reference. However, the voltage across terminals E and F as plotted in FIG. 3b can also be construed as potential in relation to any fixed potential, for example, ground or B+′, resistively connected to points E and F. The common potential at terminals E and F for zero voltage between them is also fixed in relation to such external potential. A shift in the zero line of the readout signal does not change the potential at these points E and F. Therefore, the voltages between terminals E and F, on one hand, and B+′ or ground, on the other hand, do not include anymore any common mode error in terminals C or D, as the negative summation in each point E and F eliminates potential variations resulting from baseline displacement in he readout signal.

The system is designed such that a flux transition of the recording can be detected with respect to time of occurrence and phase, whenever the voltage across terminals D passes through zero. This can be restated differently bearing in mind that passage of the voltage across terminal D through zero is to be detected as far as occurrence in time is concerned, without recreating a new problem by introducing new artificial common mode errors lines. A zero crossing to be detected is presumed to occur when the voltage across terminal D passes through a level taken down from the threshold level of diode 16 or 17 towards which it swings at that instant by the value of that level. Detection in that manner eliminates in fact common mode variation in terminals D as a result of zero line displacement in the readout signal. The detection operation is carried out as follows.

The terminals E and F serve as inputs for two separate crossover detection channels operated for polarizing the zero crossing detection. Terminals E and F are respectively connected to one input each of two differential amplifiers 22 and 23. The other input of each differential amplifier 22 and 23 receives a separately developed reference voltage. Amplifier 22 has a signal input stage 221 connected to terminal E and a reference receives stage 222. These two transistor stages do not have a common collector circuit but are biased at different levels. Transistor 222, when conductive, does not conduct at saturation.

Conduction of transistor 221 begins at a high gain with sharp rise time when the potential at the base of transistor 221 drops below the reference as applied to the base of transistor 222. The latter transistor is then turned off without delay. On the other hand, the circuit for transistor 221 establishes a high-gain amplifier and the output thereof rises sharply to the clamping level of a diode 28, clamping the collector of transistor 221 to ground when conductive. Amplifier 23 has two stages 231 and 232 connected and operated analogously. The fact that these two amplifiers 22 and 23 have coupled output circuits (line 26) will be described more fully below.

Proceeding now to the description of the reference circuit for amplifier 22, the base of transistor 222 is connected to a circuit established by a transistor 18 also having its base-to-collector electrodes short-circuited to operate as a diode. The anode (emitter) of the diode is connected to voltage source B+′, the cathode (base-collector) is connected through a resistor 24, acting as a load, to ground. Therefore, the second input of differential amplifier 22 is particularly connected to the junction of resistor 24 and the base-collector electrodes of transistor 18. It is now a characteristic feature of the system that transistors 16 and 18 are matched as closely as possible. The better the matching, the more accurate is the circuit. Deviation from matched conditions do not render the device inoperative, but may deteriorate performance as far as accuracy is concerned.

The differential amplifier 22, therefore, compares the voltage as produced at terminal point E with the threshold voltage of the base-emitter diode of transistor 18 which is closely matched with the base-emitter diode of transistor 16. This involves, in particular, comparison of the signal portion including the peaks 301 and 302 as shown in FIG. 3b, with the level as established by the forwardly biased base-emitter diode of transistor 18, the reference level being designated 303. The voltage excursion 301, in particular, and as far as its leading portion is concerned, is equal to the level 303 as established by reference diode 18 at instant 304. The significance thereof requires more detailed consideration.

As long as the voltage applied by terminal E to the base of transistor 221 remains above level 303, this transistor does not conduct. Transistor 222 conducts but not at saturation. The leading edge-type, downward slope of signal excursion 301 is produced by circuit 20—21 as signal input for amplifier 22 in that the undelayed signal fed by amplifier 20 to junction E swings down in response to an upswing of the input signal from the threshold level of diode 16 across terminals D. Additionally, the signal reaching junction E through delay line 21 is still at the level corresponding to the threshold level of diode 16 but at opposite polarity. Therefore, the two inputs for amplifier 22 are equal at the instant the input voltage of amplifier 20 dropped by a value equal to the threshold level of diode 16, which, in turn, occurs for zero voltage across terminals D to be detected. At that point, transistor 221 is rendered conductive, cutting transistor 222 off without requiring that the latter transistor is shifted out of saturation. Amplifier 22 is designed to have a high gain so that at the instant of this crossover, its output rises to the clipping level (ground) as provided by the diode 28 of bias circuit 27.

From a general point of view, amplifier 22 detects the instant one output signal of circuit 20—21 passes through a particular voltage level established by the reference circuit 18—24, That point is marked 304 in FIG. 3b and establishes a zero crossing in that the output of differential amplifier 22 provides the leading edge of an output signal. As a consequence, the differential amplifier produces, within the chosen example, the two output pulses 311 and 312, assumed to have a very sharp rise time, and the leading flank of each of them occurs at the respective zero crossing to be established. This is a zero crossing in representation of the readout signal after differentiation, and produced by reestablishing for each zero crossing a reference level.

Looking again at excursion 301, (signal input for differential amplifier 22) one can see that the downward sloping portion again traverses reference level 303. This will occur at time 305 when after polarity reversal across terminals D and after the threshold level of diode 17 has been reached, the inverted delayed output of amplifier 20 has reached a level corresponding to the threshold reference level as established by diode 18. This instant has no further significance. Due to the low gain of amplifier 20 the peak of an excursion such as 301 as extending above level 303 is quite small, and by operation of the clipping diode 28, amplifier 22, particularly state 221, does not saturate. This is incidental, it could saturate as any delay of the saturation does not have any detrimental effect on the system because the trailing edge of pulses 311, etc., has no significance. Of great importance, however, is that transistor 221 is rendered conductive without having to pull transistor 222 out of saturation at the critical leading edge slope of excursions 301, 302, etc.

The remaining circuit to be described completes symmetry of the system for detecting opposite direction zero crossings. Differential amplifier 23 receives at one of the inputs (transistor 231) the summed voltage as established at junction point F. The other input (transistor 232) of differential amplifier 23 receives potential as developed at a junction of a diode as established by the base-emitter diode of a transistor 19, having short-circuited base and collector electrodes and being connected in series with a resistor 25. This diode and the resistor 25 are also connected between B+' and ground. The junction of the resistor and of the interconnected base collector electrodes serving as cathode of the diode, is connected to the second input of the differential amplifier 23 as reference.

The diode established by the transistor 19 is now closely matched to the diode 17. As a consequence, voltage excursions at terminal F appearing thereat with inverted polarity and being equivalent to traces 308 in FIG. 3b are compared with a reference level 306 established by the threshold voltage of the base-emitter diode of transistor 19. Whenever the leading edge of an excursion such as 308 and others of like polarity, compares to level 306, a leading edge of an output pulse 313 of differential amplifier 23 is produced.

Transistor 232 of amplifier 23 when conductive is not driven to saturation by the reference signal as derived from circuit 19—25. Therefore, as conduction shifts to transistor 231 at the critical point, transistor 232 does not have to come out of saturation. This latter point was mentioned above already as an analogous situation for amplifier 22.

Differential amplifiers 22 and 23 are coupled together at one output of each of them to establish a common output line 26. The output excursions of each amplifier are thus summed to form pulses of similar polarity resulting in the pulse train as shown in FIG. 3c. It is apparent, of course, that differential amplifier 22 does not respond to the excursion 308 and amplifier 23 does not respond to excursions of the opposite polarity, such as excursions 301 and 302 of the input signal. It can, therefore, be seen that the instants of zero crossing are established by the sequence of leading signal flanks of the pulses in line 26 corresponding to instants of zero voltage across terminals D. Essential is that the sensing of that occurrence is carried out by circuitry responding to voltages which do not undergo or produce polarity changes in an output at the instant of detection so that switch-over from saturation in one direction to saturation in the opposite direction is not involved. Instrumental here is, of course, that differently directed zero crossings are detected in separate channels with a separate reference employed in each of them such that the reference does not produce saturation.

Matching of characteristics of the base-emitter diodes of transistors 18 and 19, on one hand, with the characteristics of the respective base-emitter diodes of transistors 16 and 17 on the other hand, is instrumental in obtaining accuracy for the detection obviating the need to process the readout signal itself by steepening of signal flanks. These diodes are used to provide directionally sensitive levels for signal comparison so as to establish zero crossings separately for each direction. This, in turn, permits the production of sharply defined signal edges as representation of such zero crossings; even though the production of such zero crossings may produce subsequent saturation of an amplifier (22 or 23), as desaturation thereof is independent from and has no influence on the timing of respective next signal edge defining the next zero crossing in opposite direction as that involves a different channel and the respective other amplifier therein (23 or 22).

It is significant that the output voltage of the transducer 11 is amplified at first without requiring establishing or without attempting to establish or to reproduce a base or reference level until, particularly in the low signal level region, an amplified signal voltage is obtained at sufficiently high voltage and/or current level to be referenced against a voltage, which is not directly derived from he signal voltage, whereby the referencing establishes, or reconstitutes, a baseline for zero crossing detection to be accomplished now without introducing loading into the signal path to an extent tendency to shift the base line again.

From a different point of view, the rise time of the signals across terminals D when changing between clipping levels is not changed by forced steepening but remains as gradual as it is inherent in the readout signal (after differentiation). The readout signals are referenced to each other and compared with each other in circuit elements which are operated below saturation levels, with no attempt being made to steepen any signal flank at and around the critical time to be detected. Moreover, a common mode error in terminals D with reference to any fixed source of potential and having resulted from baseline shift in the readout signal, are compensated out of the system before any zero crossing is actually detected. Instrumental here is the summing of the outputs of amplifier 20 through the delay line 21, while operating amplifier 20 at floating emitter potential.

Sharp pulse flanks with very short rise times for the output pulses of amplifiers 22 and 23 are produced without requiring saturation of the amplifiers. Instead, the low level bidirectional clipping reduces the dynamic range of the input signals for amplifiers 22 and 23 such that high-gain amplification thereof produces sufficiently steep outputs without saturation, i.e., without overdriving the amplifiers in the critical instants. In view of the fact that the output signals of the amplifiers 22 and 23 feed into a common output circuit, it is necessary to have each of these pulses such as 311, 313, 312, etc., terminated long before the next one appears. This is accomplished by utilization of the delay line 21 for modifying the signal pattern, from a configuration as shown in FIG. 2d, or one of the traces shown in FIG. 3a, to the configuration of FIG. 3b. This signal processing prior to zero crossing detection keeps the input voltages for amplifiers 22 and 23, particularly transistors 221 and 231 low throughout the period of respective conduction. The peaks of excursions 301 and 302, for example, rise only little above the reference level 303, so that transistor 221 never saturates. The same is true for transistor 231. But even if the amplifiers 22 and 23 would saturate somewhat whenever transistors 221 and 231 conduct, amplifier 22, for example, would then be pulled out of saturation at an (uncritical) instant such as 305 rather than at about the same time when amplifier 23 produces the critical sharp rise for the leading edge of its output pulses (such as 313 at instant 307).

It will be noted that the delay, as provided by delay line 21, must be at least as long so that the undelayed signal, for example, at point E, passes through the level 303 before the inverted delayed signal as derived from the other output of amplifier 20 begins to swing down from he clipping level, so that the resulting signal (FIG. 3b) does, in fact, reach that clipping level at the time of zero crossing of the undelayed signal as to permit response of the differential amplifier 22 or 23, as the case may be at that time. Thus, that delay will exceed half the total rise time of each of the signals across terminals D as swinging from one level to the other. On the other hand, the delay should be selected to be as short as possible to prevent signal attenuation and frequency dependent distortion in the delay line from entering into consideration as a material parameter.

The invention is not limited to the embodiments described above but all changes and modifications thereof not constituting departures from the spirit and scope of the invention are intended to be included.

I claim:

1. Apparatus for processing signals derived from a transducer reading a recording of digital signals on a magnetic storage carrier moving relative to the transducer, the transducer having an output circuit to provide electrical readout signals, comprising:

first means connected to the output circuit and differentiating readout signals as provided by the output circuit in response to transducer readout operation, the first means having a pair of terminals between which the differential signals develop;

second means connected to the pair of terminals for clipping the signals at each polarity as developed between the terminals of the pair;

a delay line differentiating circuit connected to the pair of terminals to receive the clipping signals and having two-phase outputs; and means connected for separately comparing the output signals of the two-phase output with a pair of reference signals representative of the clipping levels as provided by the second means to provide a train of pulses having characteristics repeatedly occurring when the signal across the terminals of the pair has a particular value between the clipping levels.

2. Apparatus as set forth in claim 1, the delay line differentiating circuit including a low gain differential amplifier and a delay line connected across its output terminals.

3. Apparatus as set forth in claim 1, the second means being a pair of first diodes connected across the terminals of the pair of reference signals.

4. Apparatus as set forth in claim 1, the delay line differentiating circuit including a low gain differential amplifier and a delay line connected across its output terminals, the second means being a pair of first diodes connected across the terminals of the pair;

the apparatus including a second pair of diodes individually matched to the diodes of the first pair for providing the pair of reference signals; and the comparing means including a pair of high-gain differential amplifiers respectively comparing the signals at one side of the delay line as connected to one output terminal of the low-gain amplifier with a reference signal of the pair as provided by one diode of the second pair of diodes.

5. A crossover detector, comprising:

first means including a pair of terminals for providing an AC signal of possibly variable amplitude and/or frequency across the terminals of the pair;

clipping means connected across the terminals to clip the AC signal at each polarity;

a low-gain differential amplifier having its input connected to said terminals to receive said clipped signal and having a pair of output terminals;

a delay line connected across the output terminals of the pair to establish a delay line differentiating circuit;

second means for providing a voltage representative of at least one of the clipping levels at one polarity; and high-gain differential amplifying means having two input terminals one of which is connected to one of the pairs of output terminals, the other of the input terminals connected to receive the voltage provided by the first means.

6. A crossover detector as set forth in claim 5, the first means including a transducer for reading a recording on a storage carrier, the signals being provided in response to the readout process.

7. A detector as set forth in claim 6, the first means including a second delay line to establish a delay line differentiating circuit from the transducer readout signal, the signal being derived from across the second delay line.

8. A crossover detector, comprising:

first means including a pair of terminals for providing an AC signal of possibly variable amplitude and/or frequency across the terminals of the pair;

clipping means connected across the terminals to clip the AC signal at each polarity;

means connected to receive the clipped signal and providing first and second signals in phase opposition representative thereof;

reference means to provide first and second reference signals; and first and second comparing means connected to compare the first and second reference signals respectively with the first and second signals and respectively responsive to provide first and second signal pulse trains, the pulses of the first train provided when in response to a change of the clipped signal in one direction the first signal compares with the first reference signal, the pulses of the second train provided when in response to a change of the clipped signal between clipping levels in the opposite direction the second signal compares with the second reference signal.

9. A crossover detector as set forth in claim 8, the first means including a transducer for reading digital signals from a storage carrier, the spacing of sequential zero crossings of the AC signal having digital significance.

10. A crossover detector for the detection of zero crossing of signals of the type resulting from reproduction of digital recordings comprising:

first means for receiving a signal of variable amplitude and variable polarity as derived from a transducer or the like;

second means connected for clipping the amplitude of the signal as received at least in one polarity and at a particular level from zero crossing of the signal;

third means for providing a reference signal in representation of the particular level; and fourth means including comparator means connected to receive the clipped signal to compare a representation thereof with the reference signal and including pulse producing means to provide an output pulse at steeper rise time than the slope of the clipped signal pulse subsequent to clipping and at duration shorter than the period between two sequential zero crossings of the signal at opposite polarity.

11. A circuit for providing representation of the zero crossing of an AC signal of variable frequency and/or amplitude as developed between a first pair of terminals comprising:

first means connected to the first pair of terminals and having a second pair of terminals and providing a signal between the terminals of the second pair in representation of differentiation of the signal developed between the terminals of the first pair;

second means connected across the terminals of the second pair for clipping the signals between the second pair of terminals so that the latter signal does not exceed a clipping level at least for one polarity;

third means including nonsaturation amplifier means and connected to the terminals of the second pair to provide two separate signal trains mutually representative of each other;

fourth means providing a pair of reference signals individually representative of the clipping levels;

a pair of fifth means connected to the third means and to the fourth means to separately compare the signals of the train with the reference signals of the pair, and respectively providing output signals with sharp rise times in mutually clutching relation and if individually the signals of a train of the trains has particular relation to the respective reference signal with which it is compared; and sixth means for combining the outputs of the pair of fifth means.

12. A circuit for providing representation of the zero crossing of an AC signal of variable frequency and/or amplitude as developed between a first pair of terminals, comprising;

first means connected to the first pair of terminals and having a second pair of terminals and providing a signal between the terminals of the second pair in representation of differentiation of the signal developed between the terminals of the first pair;

second means connected across the terminals of the second pair for clipping the signals between the second pair of terminals so that the latter signal does not exceed a clipping level at least for one polarity;

third means connected to the terminals of the second pair and providing a first signal equal to the sum of a second signal as derived from the signal between the second pair of terminals, and a third signal equal to a delayed inversion of the second signal; and fourth means providing a fourth signal in representation of the clipping level, comparing same with the first signal and producing a representation when the fourth signal equals the first signal.